US009100976B2

(12) United States Patent
Li et al.

(10) Patent No.: US 9,100,976 B2
(45) Date of Patent: Aug. 4, 2015

(54) DEVICE-TO-DEVICE DISTRIBUTED SCHEDULING

(71) Applicant: Intel Corporation, Santa Clara, CA (US)

(72) Inventors: Honggang Li, Beijing (CN); Qinghua Li, San Ramon, CA (US); Huaning Niu, Milpitas, CA (US); Hujun Yin, Saratoga, CA (US); Yuan Zhu, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/126,035

(22) PCT Filed: Sep. 27, 2013

(86) PCT No.: PCT/US2013/062277
§ 371 (c)(1),
(2) Date: Dec. 13, 2013

(87) PCT Pub. No.: WO2014/088687
PCT Pub. Date: Jun. 12, 2014

(65) Prior Publication Data
US 2014/0169298 A1    Jun. 19, 2014

Related U.S. Application Data

(60) Provisional application No. 61/732,851, filed on Dec. 3, 2012.

(51) Int. Cl.
*H04W 72/12*       (2009.01)
*H04W 24/10*       (2009.01)
*H04B 1/3827*      (2015.01)
*H04W 84/18*       (2009.01)
*H04W 92/18*       (2009.01)
*H04W 72/04*       (2009.01)
*H04L 5/00*        (2006.01)

(52) U.S. Cl.
CPC ............. *H04W 72/12* (2013.01); *H04B 1/3827* (2013.01); *H04L 5/0055* (2013.01); *H04W 24/10* (2013.01); *H04W 72/048* (2013.01); *H04W 72/121* (2013.01); *H04W 72/1242* (2013.01); *H04W 72/1247* (2013.01); *H04W 84/18* (2013.01); *H04W 92/18* (2013.01)

(58) Field of Classification Search
None
See application file for complete search history.

(56) References Cited

U.S. PATENT DOCUMENTS 8,694,662 B2 * 4/2014 Wu et al. .................... 709/230
2007/0248114 A1 * 10/2007 Jia et al. ...................... 370/465

(Continued)

OTHER PUBLICATIONS

International Search Report and Written Opinion received for PCT Patent Application No. PCT/US2013/062277, mailed on Jan. 22, 2013, 12 Pages.

(Continued)

*Primary Examiner* — Jackie Zuniga Abad
*Assistant Examiner* — Justin T Van Roie
(74) *Attorney, Agent, or Firm* — Carrie A. Boone, P.C.

(57) ABSTRACT

A system and method for distributed scheduling of transmissions between device-to-device (D2D) communications is disclosed. The distributed scheduling method employs a distributed scheduling structure in which device identifiers rather than connection identifiers are used to enable scheduling of a D2D data transfer between devices in a wireless neighborhood. The novel distributed scheduling structure is scalable to a larger number of D2D devices than is feasible with a connection identifier-based tone matrix.

16 Claims, 15 Drawing Sheets

(56) References Cited

U.S. PATENT DOCUMENTS

| | | |
|---|---|---|
| 2009/0135720 A1* | 5/2009 | Li et al. .................. 370/232 |
| 2009/0232086 A1 | 9/2009 | Li et al. |
| 2010/0118733 A1 | 5/2010 | Wu et al. |
| 2010/0120372 A1 | 5/2010 | Li et al. |
| 2012/0008570 A1 | 1/2012 | Li et al. |

OTHER PUBLICATIONS

Wu, et al., "FlashLinQ: A Synchronous Distributed Scheduler for Peer-to-Peer Ad Hoc Networks", 48th Annual Allerton Conference on Communication, Control, and Computing, Sep. 29-Oct. 1, 2010, pp. 514-521.

* cited by examiner

Figure 2
(prior art)
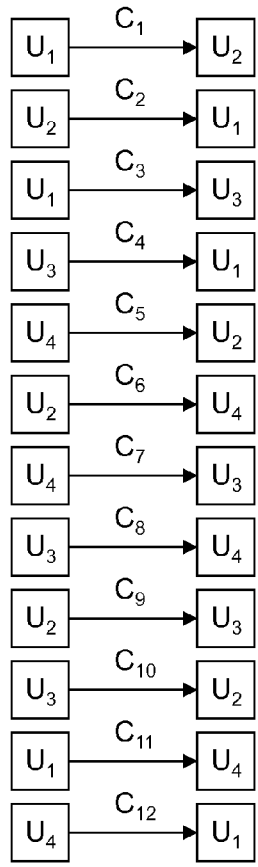
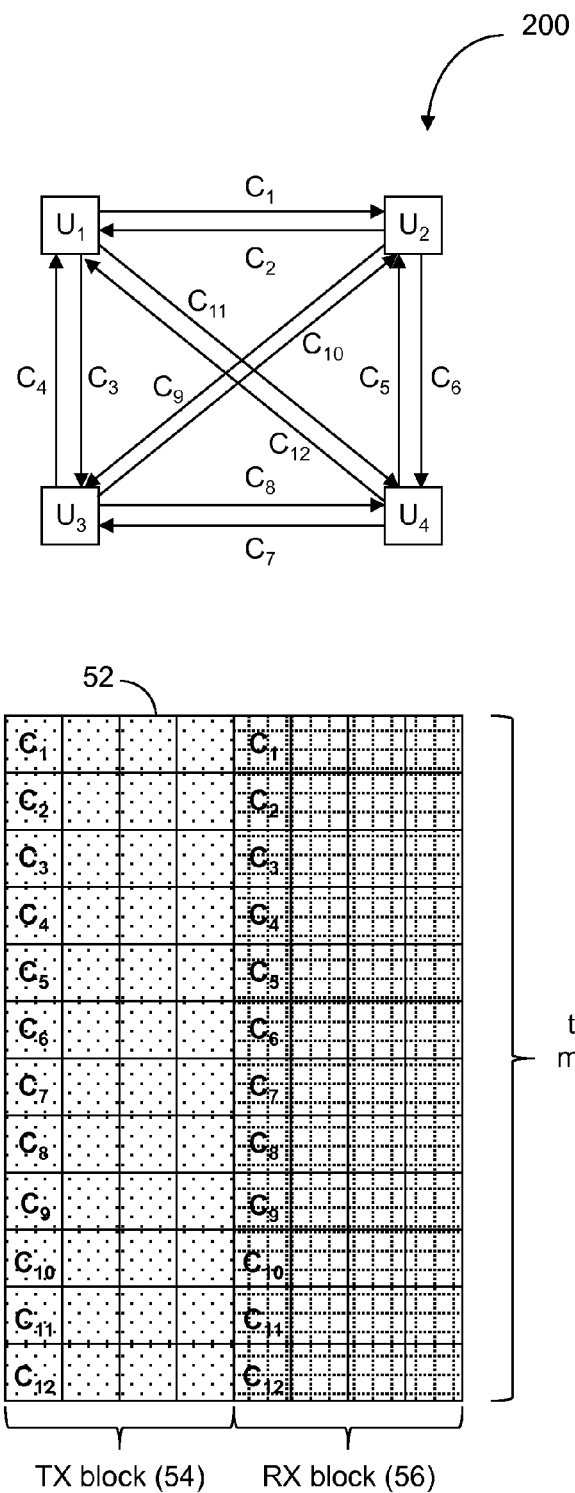

Figure 3
(prior art)
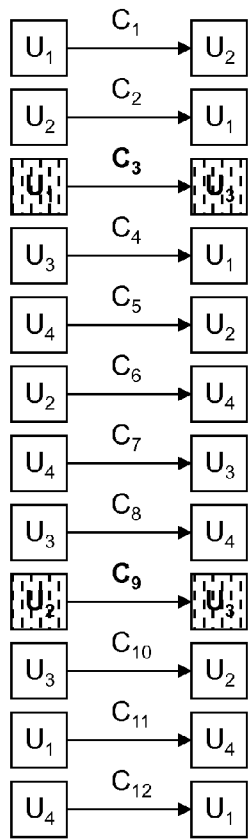
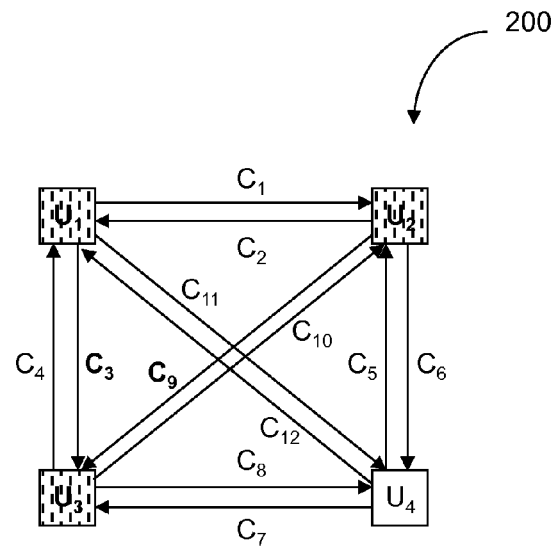
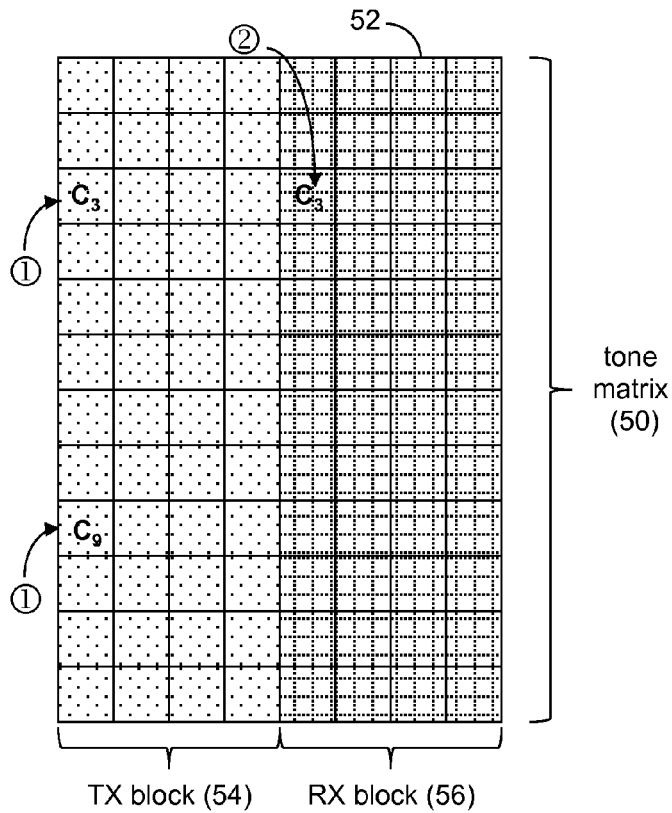
① $U_1$ & $U_2$ simultaneously request transmission to $U_3$
② $U_3$ accepts $U_1$ request, but ignores $U_2$ request Figure 4
(prior art)
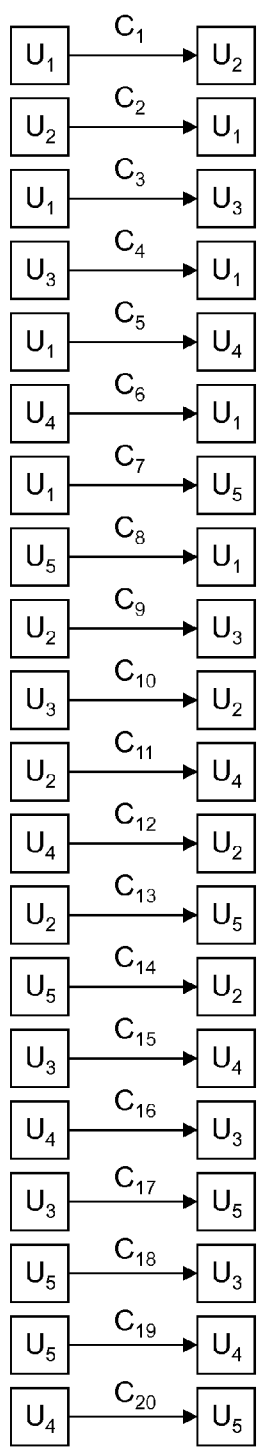
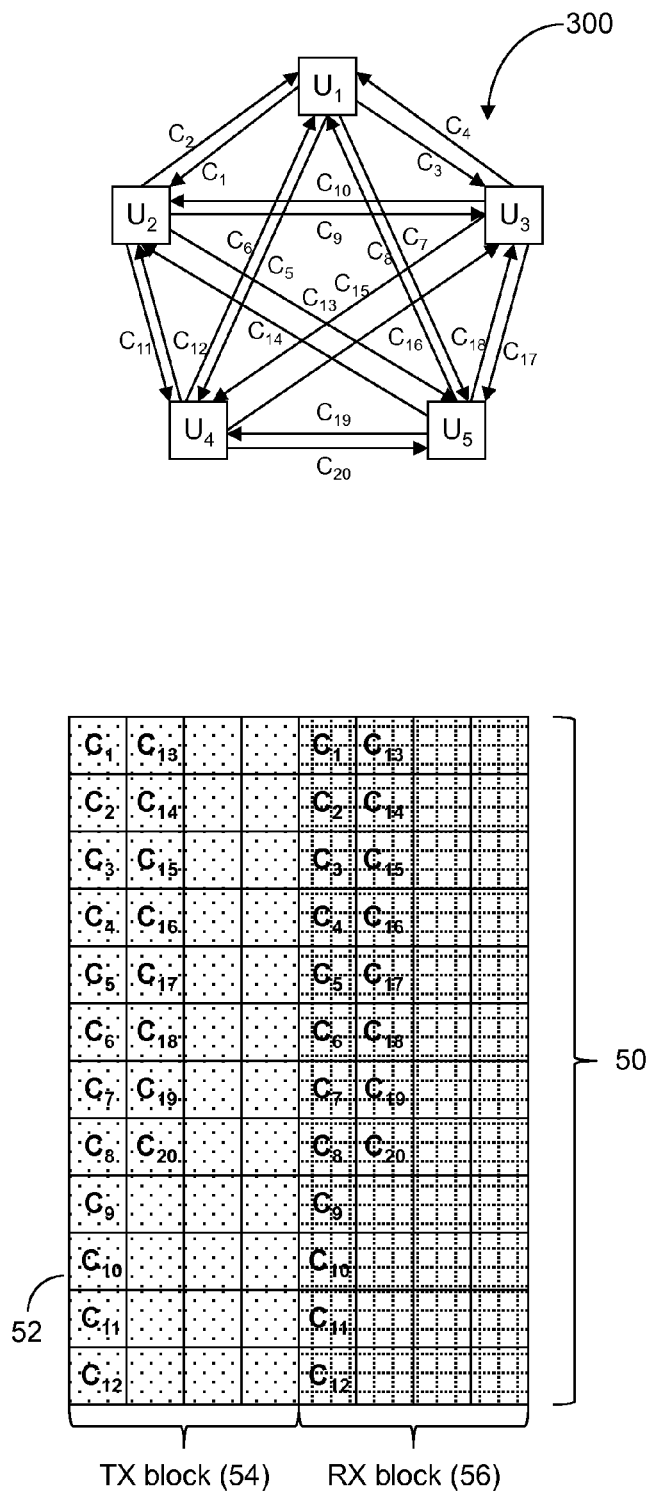

Figure 5
(prior art)
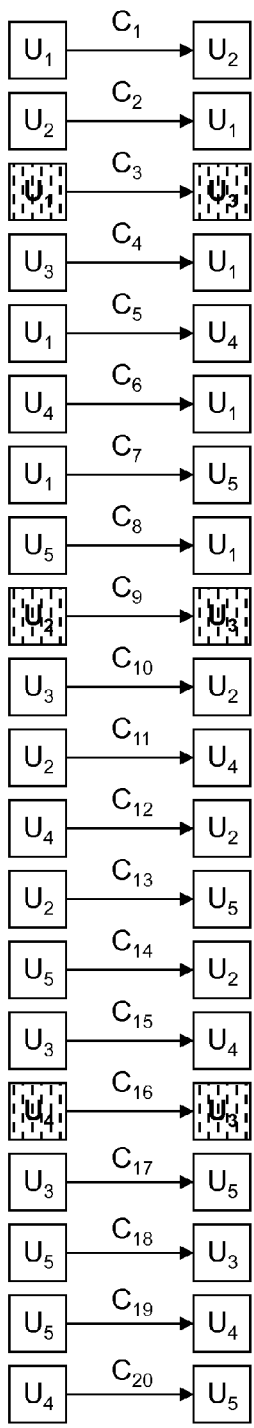
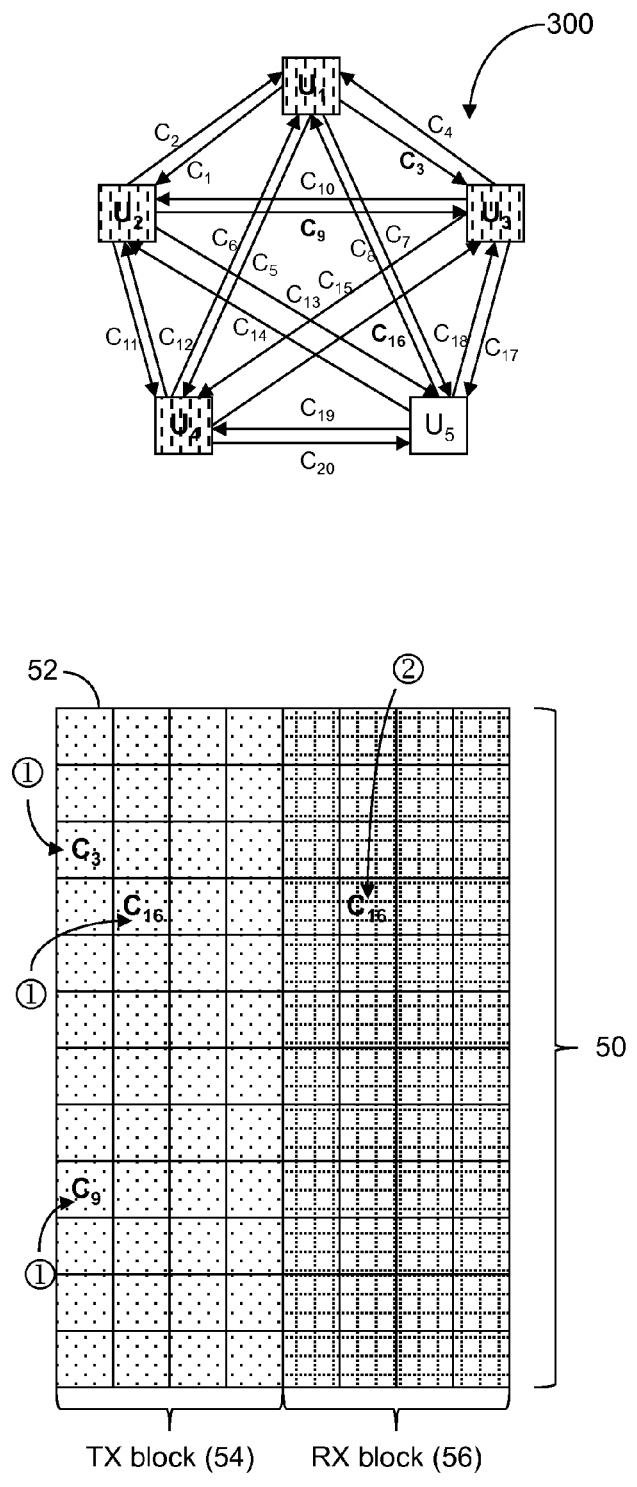

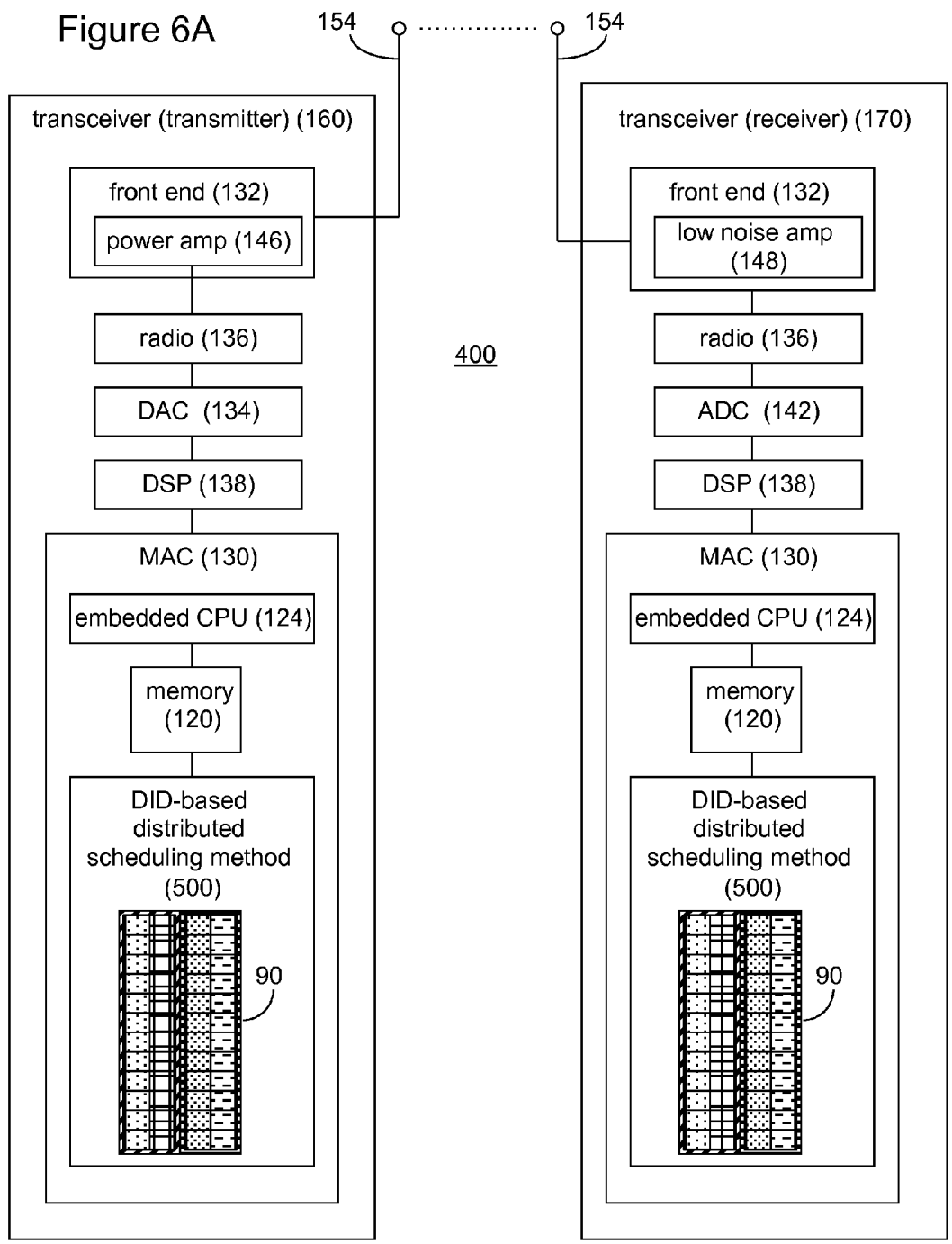

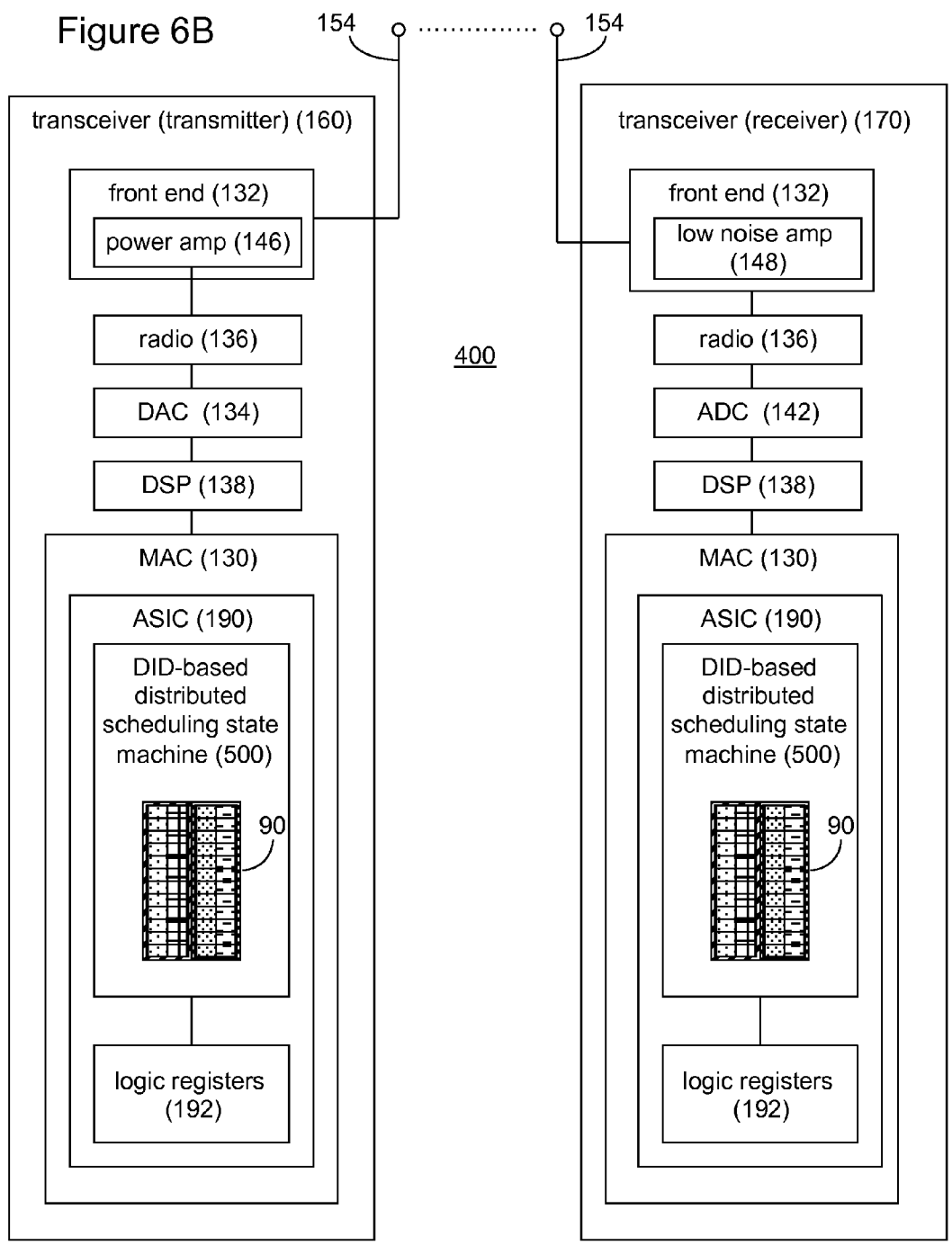

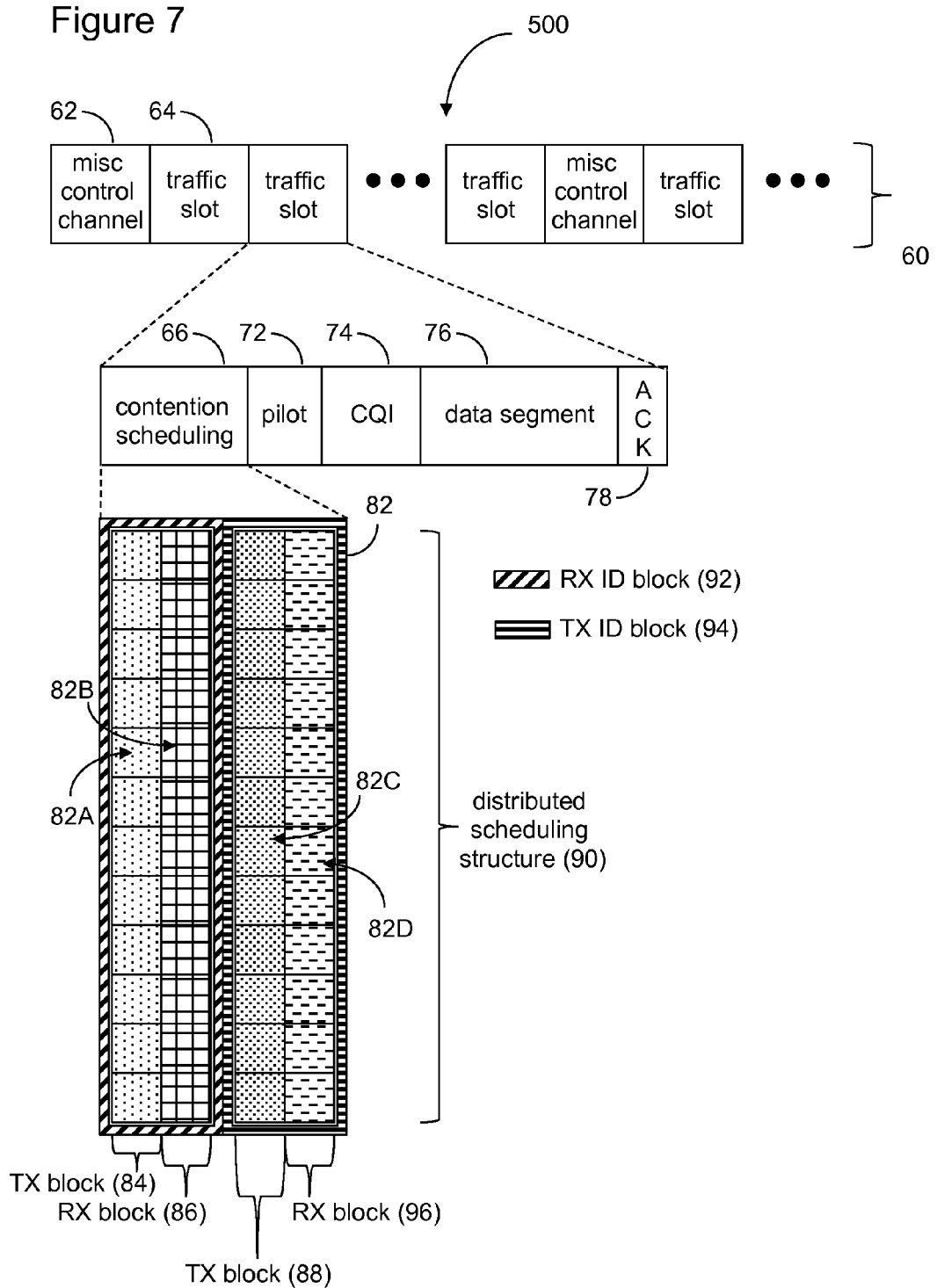

① $TX_4$ and $TX_8$ request connection to $RX_3$

② $RX_3$ acknowledges being available

③ $TX_4$ and $TX_8$ identify selves as connection requestors

④ $RX_3$ selects $TX_4$ for connection and data transmission

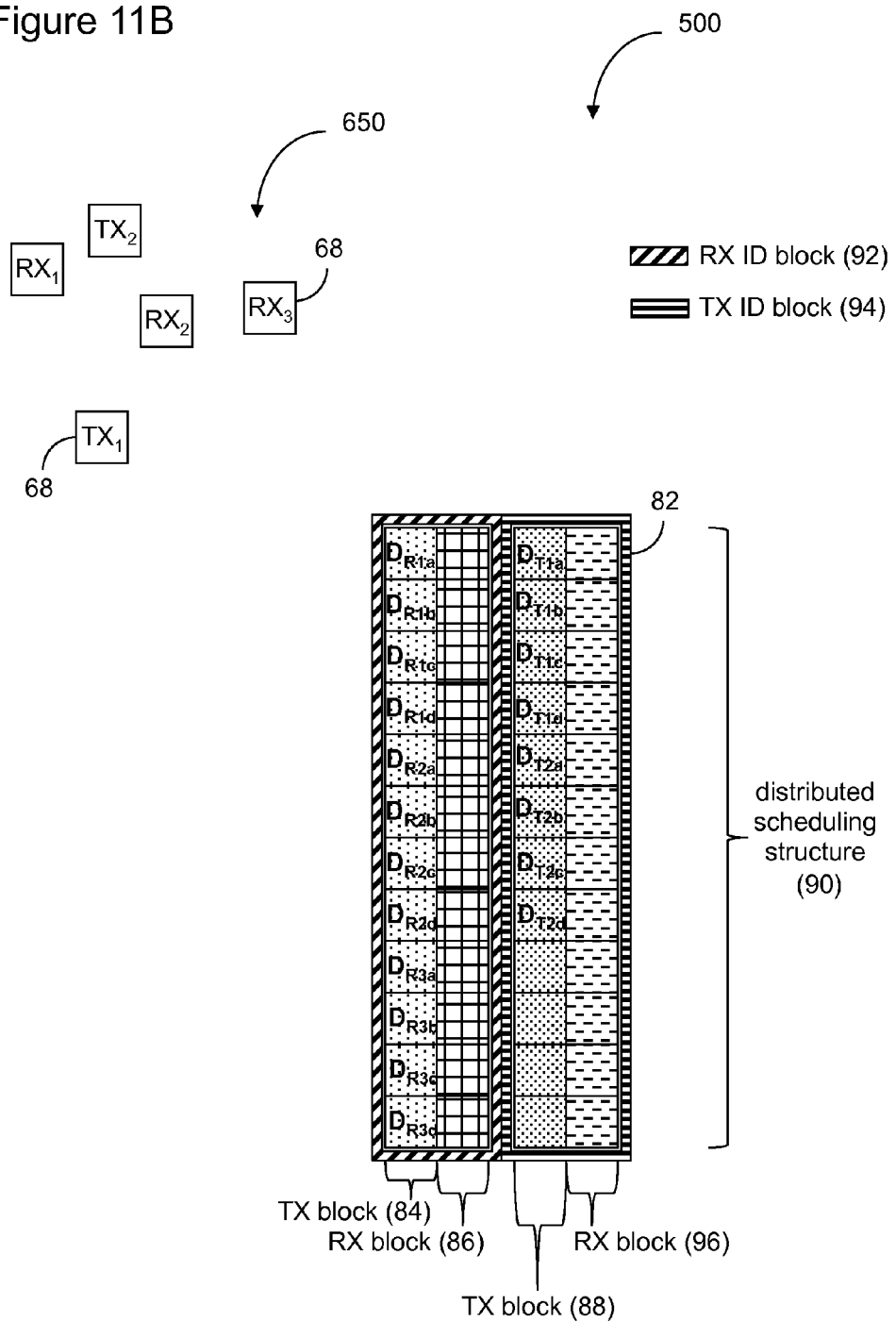

① TX₂ requests connection to RX₇

② another transmitter unknown to transmitter TX₂ requests connection to RX₃,

③ RX₃ and RX₇ acknowledge that they are available; received power from RX₃ and RX₇ is strong ④ TX₂ compares priority of RX₃ and RX₇, quits ① TX$_2$ requests connection to RX$_7$ ② another transmitter unknown to transmitter TX$_2$ requests connection to RX$_3$, ③ RX$_7$ compares the priorities of itself and RX$_3$ and does not respond

DEVICE-TO-DEVICE DISTRIBUTED SCHEDULING

CROSS-REFERENCE TO RELATED APPLICATIONS

This application is a continuation of PCT Patent Application No. PCT/US2013/062277, filed on Sep. 27, 2013, which claims the benefit of U.S. Provisional Patent Application No. 61/732,851 filed on Dec. 3, 2012.

TECHNICAL FIELD

This application relates to distributed scheduling for device-to-device transmissions under 3GPP LTE.

BACKGROUND

Device-to-device (D2D) communications are supported under 3GPP LTE (short for third-generation partnership project—long-term evolution), and companies are developing methods for distributed scheduling operations between the devices.

Distributed scheduling in D2D communications is a channel allocation mechanism where channel request and allocation are done, not by a central device, but by a pair of transmitter and receiver devices themselves. With this mechanism, multiple pairs of devices can share the channel resources. One prior art solution employs tone matrix-based distributed scheduling. The proposed solution, however, does not scale well with the number of transmitters and receivers in the transmission space.

Thus, there is a continuing need for a tone matrix-based D2D scheduling mechanism that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 2 is a diagram showing transmitter-receiver pairs and connection IDs for a wireless neighborhood having two transmitters and two receivers, according to some embodiments;

FIG. 3 is a diagram showing how the tone matrix is used for distributed scheduling in the wireless neighborhood of FIG. 2, according to some embodiments;

FIG. 4 is a diagram showing transmitter-receiver pairs and connection IDs for a wireless neighborhood having three transmitters and three receivers, according to some embodiments;

FIG. 5 is a diagram showing how the tone matrix is used for distributed scheduling in the wireless neighborhood of FIG. 4, according to some embodiments;

FIGS. 6A and 6B are block diagrams of two transceivers employing the device ID-based distributed scheduling method for D2D transmissions using a novel distributed scheduling structure, according to some embodiments;

FIG. 7 is a block diagram of the novel distributed scheduling structure used by the device ID-based distributed scheduling method of FIGS. 6A or 6B, according to some embodiments;

FIGS. 11A and 11B are diagrams showing two- and four-tone DID solutions, respectively used by the device ID-based distributed scheduling method of FIG. 7, according to some embodiments;

DETAILED DESCRIPTION

In accordance with the embodiments described herein, a system and method for distributed scheduling of transmissions between D2D devices is disclosed. The distributed scheduling method employs a novel distributed scheduling structure in which device IDs rather than connection IDs are used to enable scheduling of a D2D data transfer between devices in a wireless neighborhood. The distributed scheduling structure includes tones that are distributed in frequency and time physically. The novel distributed scheduling structure is scalable to a larger number of D2D devices than is feasible with a connection ID-based tone matrix.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 1:
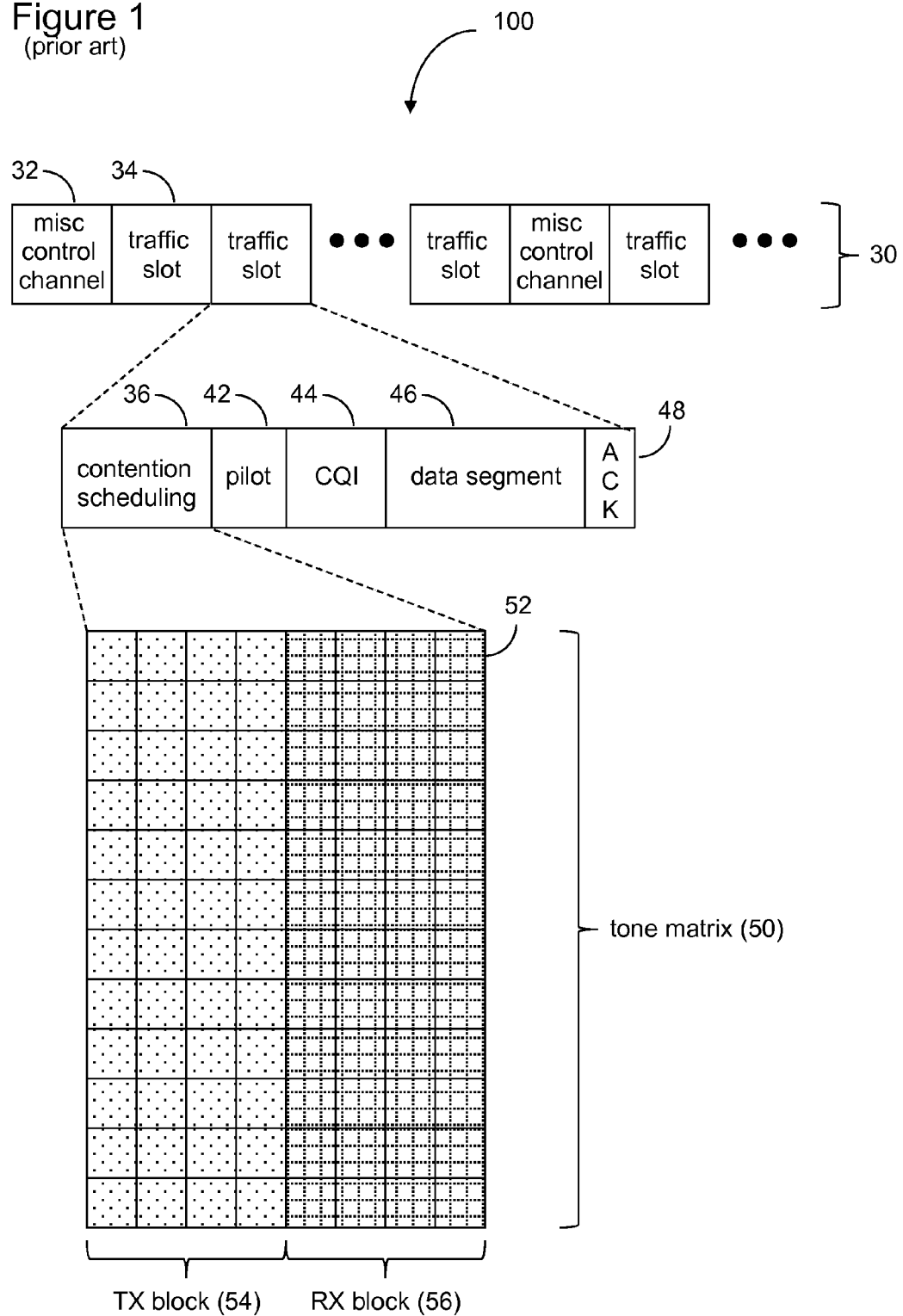
FIG. 1 is a block diagram of a tone matrix used in distributed scheduling operations under D2D, according to some embodiments.

FIG. 1 is a block diagram of a connection identifier-based (CID-based) distributed scheduling D2D method 100. A data stream 30 is made up of both miscellaneous control channels 32 and traffic slots 34. Each traffic slot 34 is made up of the following fields: contention scheduling 36, pilot 42, channel quality indicator (CQI) 44, data segment 46, and acknowledgement 48.

Each traffic slot 34 includes a contention scheduling header 36 made up of a transmit (TX) block 54 and a receive (RX) block 56. Together, the TX block 54 and the RX block 56 are known as a tone matrix 50. The tone matrix 50 enables a potential transmitter in a wireless neighborhood to contend for a data segment 46 in the traffic slot 34, thus allowing D2D communication with a receiver also in the wireless neighborhood.

The tone matrix 50 is made up of individual tones 52. The tones 52 are enabled or disabled (ON or OFF), which enable communication between transmitter-receiver pairs. The TX block 54 of the tone matrix 50 is depicted as a 12×4 grid of polka-dotted tones 52 while the RX block 56 of the tone matrix is depicted as a 12×4 grid of checkerboard tones. The tones 52 occupy both the TX block 54 and the RX block 56. The tone matrix 50 may be larger or smaller, depending on the number of connections between devices in the wireless neighborhood.

FIG. 2 is a block diagram showing a wireless neighborhood 200 consisting of four users. Each user is likely a transceiver, with both a transmit function and a receive function. Connection identifiers (CIDs), denoted $C_1$-$C_{12}$, are shown for each possible user pairing, with each CID being assigned to a unidirectional connection between two users. Thus, a connection between user $U_1$ and user $U_2$ is assigned a CID of $C_1$; a connection between user $U_2$ and user $U_1$ is assigned a CID of $C_2$. The CIDs are arbitrary, with the only requirement being that each connection between two users has a unique CID. As FIG. 2 illustrates, twelve connections are possible with four users.

Each pair of users is assigned a unique CID and allocated a tone-pair, one in the TX block 54 and one in the RX block 56. A tone pair is simply a tone 52 located in the TX block 54 and an analogous tone (same row, same column) in the RX block 56. When a tone or "1" or ON value is placed in either or both of the tones 52 making up that tone pair, the CID assigned to that tone pair, and thus the connected users, is referenced. In other words, a particular tone pair (e.g., tone in TX block and analogous tone in RX block) in the tone matrix 50 is mapped to a particular CID. Thus, when a transmitter "sends a signal on the tone" of the TX block 54, this essentially means that the transmitter is enabling one of the tones 52 in the tone matrix 50, with the tone having previously been associated with a distinct CID. The receiver that is part of the connection having the CID is thus notified of the signaling by the transmitter. Similarly, when the receiver "sends a signal on the tone" of the RX block 56, the receiver is likewise essentially enabling one of the tones 52 in the RX block 56 of the tone matrix 50, thus notifying the transmitter that is part of the connection. In this manner, the transmitters and receivers making up the wireless neighborhood have a mechanism, the tone matrix 50, with which to communicate with one another.

In FIG. 2, the first twelve tones 52 of the TX block 54 are allocated to the twelve connections denoted by CIDs $C_1$-$C_{12}$ of the wireless neighborhood 200. Similarly, the first twelve tones of the RX block 56 are allocated to the twelve connections denoted by CIDs $C_1$-$C_{12}$ of the wireless neighborhood 200. So, for just four users, there are twelve tone pairs representing twelve CIDs, $C_1$-$C_{12}$, for a total of twenty-four tones 52 being allocated in the tone matrix 50.

In the drawings, the CIDs are allocated in numerical order for ease of presentation. However, other tones 52 of the TX block 54 and RX block 56 may be assigned the CIDs. The assignments need not be consecutive or necessarily adjacent to one another, for example. Further, the CIDs may be assigned to a tone pair as the connections are made or according to some other criteria, and are not necessarily presented in numerical order. Nevertheless, if the first tone 52 of the TX block 54 is allocated to a particular CID (in this case, $C_1$), then the first tone 52 of the RX block 56 is allocated that same CID, with $C_1$ referring to a unidirectional connection from $U_1$ to $U_2$. In the tone matrix 50, up to 48 connections may be allocated a tone pair.

If the transmitter has data to send, the transmitter will send a signal on the tone 52 of the TX block 54 as a request. Subsequently, to acknowledge the request, the receiver sends a signal on the analogous tone of RX block 56, with the tone and the analogous tone making up the tone pair. Upon receiving the acknowledgement, both users making up the connection referenced by the CID, the transmitter and the receiver, have become mutually aware of the pending transaction. Thus, the transmitter is able to send data in the data segment 46, knowing that the receiver will retrieve the data.

FIG. 3 shows one scenario for using the tone matrix 50 to perform distributed scheduling. In this example, both $U_1$ and $U_2$ want to send data to $U_3$. The users in this scenario, $U_1$, $U_2$, and $U_3$, are illustrated in vertical dashes. First, user $U_1$ and user $U_2$ simultaneously request user $U_3$ by each sending a signal on the tone 52 of the TX block 54 (where the relevant CID is located according to the CID assignments of FIG. 2, with $C_1$ occupying the first row, first column tone pair, $C_2$ occupying the second row, first column tone pair, and so on). For $U_1$ to $U_3$, the CID is $C_3$ and the CID position is the third tone 52 in the first column of the TX block 54 of the tone matrix 50; for $U_2$ to $U_3$, the CID is $C_9$ and the CID position is the ninth tone 52 in the first column of the TX block 54 of the tone matrix.

In this case, multiple users, $U_1$ and $U_2$, have data to send to a third user, $U_3$. To resolve this, a different priority can be assigned to each tone 52, such that the CID that occupies a higher-priority tone is preferred over a CID with a lower priority. The mapping of the CIDs in the tones 52 within the tone matrix 50 can be randomized, slot-by-slot, to guarantee the fairness among users. In FIG. 3, the user, $U_3$ accepts the user $U_1$ request by sending a signal on the RX block 56 corresponding to CID $C_3$, while the user $U_2$ request is ignored. In this manner, the transmission request of user $U_1$ is serviced and the user $U_3$ knows to subsequently retrieve the data. User $U_2$'s transmission request will have to be serviced at a later time.

The TX block 54 and the RX block 56 of the tone matrix 50 thus provide a mechanism in which connected transmitter-receiver pairs can handshake with one another to initiate data transmission. Simply, the transmitter(s) wanting to transmit data let the desired receiver know by turning on the relevant tone 52 in the TX block 54 associated with the desired CID, and the receiver accepts the transmission request for one of the requesting transmitters by turning on the analogous tone in the RX block 56 of the CID.

Because the above scheme is CID-based, each tone 52 of the tone matrix 50 is available to be mapped to a CID. As the number, N, of D2D devices increases, the size of the tone matrix 50 increases, as the square of N, or $N^2$, so as to allow direct communication between any two devices. Namely, $N^2$ tones in both the TX block 54 and the RX block 56 are required. Thus, supporting a D2D group having more than about thirty users, e.g., about the size of a classroom, becomes problematic.

FIG. 4, for example, illustrates the scaling problem. Here, a wireless neighborhood 300 features five users, U1, U2, U3, U4, and U5. Twenty possible unidirectional connections are possible and thus twenty possible CIDs are established, denoted $C_1$-$C_{20}$. If each connection is associated with a tone pair consisting of a tone 52 of the TX block 54 and an analogous tone of the RX block 56, a total of 40 tones 52 (20 tone-pairs) are allocated within the tone matrix 50, to service merely five users.

As N grows, so does the size of the tone matrix 50. In some embodiments, the number of tone pairs is given by the following formula:

$$\text{\# of tone pairs} = 2 * N * (N-1) \quad (1)$$

Thus, where there are four users (FIGS. 2 and 3), N=4, the number of tones 52 needed to support distributed scheduling under D2D is 24 (twelve tone pairs). Where there are five users (FIGS. 4 and 5), N=5, the number of tones 52 needed for distributed scheduling under D2D is 40 (20 tone pairs). Where there are eight users, N=8, the number of tones 52 needed for distributed scheduling is 112 (56 tone pairs). Thus, for values of N greater than seven, the size of the tone matrix 50, which has but 48 tone pairs, would need to grow.

FIG. 5 shows a scenario for using the tone matrix 50 to peform distributed scheduling between three users, $U_1$, $U_2$, and $U_4$, each of which want to communicate with user $U_3$. Again, the users are illustrated in vertical dashes. First, user $U_1$, user $U_2$, and user $U_4$, simultaneously request the user, $U_3$ by each sending a signal on the TX block 54 where the relevant CID is (in this example, the CID assignments of FIG. 4 are assumed). For $U_1$ to $U_3$, the CID is $C_3$ and the CID position is the third block 52 of the TX block 54 of the tone matrix 50; for $U_2$ to $U_3$, the CID is $C_9$ and the CID position is the ninth block 52 of the TX block of the tone matrix; for $U_4$ to $U_3$, the CID is $C_{16}$ and the CID position is the sixteenth block 52 of the TX block of the tone matrix.

After the users (transmitters) have populated the TX block 54 with the relevant CIDs, the user (receiver) $U_3$ decides which of the three requests to honor. In this case, by sending a signal on the tone 52 where the CID $C_{16}$ is located, the user $U_3$ selects the user $U_4$. The selection of one user over another may be based on some selection criteria, whether by a priority scheme, or a randomized one. In FIG. 5, the user $U_3$ (receiver) accepts the user $U_4$ (transmitter) request by sending a signal on the tone 52 of the RX block 56 corresponding to CID $C_{16}$, while the $U_1$ and $U_2$ transmitter requests are ignored.

Contrasting the wireless neighborhoods 200 (FIGS. 2 and 3) and 300 (FIGS. 4 and 5), it is easy to understand that the tone matrix 50 will quickly run out of tones 52 to assign to CIDs if the number of users increases. For D2D transmissions between thirty transmitter-receiver pairs, for example, the tone matrix becomes unwieldy.

FIG. 6A is a simplified block diagram of a wireless neighborhood 400 having two transceivers 160, 170, where the two transceivers employ a device ID-based distributed scheduling method 500, according to some embodiments. In this example, the first transceiver 160 operates as a transmitter and the second transceiver 170 operates as a receiver.

Each transceiver includes an antenna 154, a front-end 132, a radio 136, a baseband digital signal processor (DSP) 138, and a medium access controller (MAC) 130. The transmitter 160 includes a power amplifier 146 in its front-end 132 while the receiver 170 includes a low noise amplifier 148 in its front-end. The transmitter 160 includes a digital-to-analog converter (DAC) 134 while the receiver 170 includes an analog-to-digital converter (ADC) 142. The transceivers 160 and 170 may be virtually any wireless device, such as a laptop computer, a cellular phone, or other wireless system, and may operate as a transmitter (transmit mode) or as a receiver (receive mode).

The MAC 130 includes an embedded central processing unit (CPU) 124 and a data memory 120, such that the device ID-based distributed scheduling method 500, some portion of which is software-based, in some embodiments, may be loaded into the memory and executed by the CPU. The depictions of FIGS. 6A and 6B are simplified representations of the MAC 130, and other devices, circuits, and logic elements that may be part of the MAC are omitted.

The MAC 130 interfaces with logic devices that are commonly found in transmitters and receivers: the front-end 132, the DAC 134, the ADC 142, the radio 136, and the DSP 138. The devices 132, 134, 136, 138, and 142 are also known herein as target modules. The target modules, as well as the logic devices within the MAC 130, may consist of hardware, software, or a combination of hardware and software components.

The target modules are commonly found in most transmitters and receivers. A front end (FE) 132 is connected to the antenna 154, and includes a power amplifier (PA) (for the transmitter), a low noise amplifier (LNA) (for the receiver), and an antenna switch (not shown), for switching between transmitter and receiver modes. The DAC 134 is used to convert the digital signal coming from the DSP 138 to an analog signal prior to transmission via the radio (transmitter); conversely, the ADC 142 is used to convert the analog signal coming from the radio to a digital signal before processing by the DSP 138 (receiver). At the transmitter 160, the radio 136 transfers the signal from base-band to the carrier frequency; at the receiver 170, the radio 136 transfers the signal from carrier frequency to base-band. At the receiver 170, the DSP 138 demodulates the OFDM signal from the ADC 142, for processing by the MAC 130. At the transmitter 160, the DSP 138 modulates the MAC data into an OFDM signal in base-band frequency, and sends the resulting signal to the DAC 134.

A typical transmit operation occurs as follows: at the transmitter 160, the MAC 130 sends a packet to the DSP 138. The DSP 138 converts the packet into a digital OFDM signal and sends it to the DAC 134. The DAC 134 converts the signal into an analog signal, and sends the signal to the radio 136. The radio 136 modulates the base-band signal to the carrier frequency and sends the signal to the power amplifier 146 of the front-end 132, which amplifies the signal to be suitable for over-air transmission via the antenna 154.

At the receiver 170, the signal is received by the antenna 154. The weak analog signal is received into the low noise amplifier 148 of the front-end 132, sending the amplified analog signal to the radio 136, which filters the signal according to the selected frequency band and demodulates the carrier frequency signal into base-band. The radio 136 sends the analog signal to the ADC 142, which converts the analog signal to a digital signal, suitable for processing by the DSP 138. The DSP 138 demodulates the OFDM signal and converts the signal to MAC 130 packet bytes. Other operations, such as encryption and decryption of the packets, are not shown. Where the transmission is successful, the packet received by the MAC 130 in the receiver 170 is the same as the packet transmitted by the MAC 130 in the transmitter 160.

In the MAC, the device ID-based distributed scheduling method 500 employs a new, modified distributed scheduling structure 90, described in more detail below, that replaces the tone matrix 50. The device ID-base distributed scheduling method 500 is implemented in software, in some embodiments, with the software being loaded into the memory 120 and executed by the embedded CPU 124. In other embodiments, as depicted in FIG. 6B, the transceivers 160 and 170 do not include a CPU 124 in the MAC 130. Instead, an application-specific integrated circuit (ASIC) 190 may drive the distributed scheduling method 500 as a state machine implemented using logic registers (192). The ASIC solution of FIG. 6B may be preferred over the MAC-based implementation of FIG. 6A, for example, in systems in which low power consumption is important. The device ID-based distributed scheduling method 500 is described in more details, below.

FIG. 7 presents another illustration of the device ID-based distributed scheduling method 500, according to some embodiments. Similar to the depiction in FIG. 1, in a second device ID-based distributed scheduling method 500, a data stream 60 is made up of both miscellaneous control channels 62 and traffic slots 64. Each traffic slot 64 is made up of the following fields: contention scheduling 66, pilot 72, CQI 74, data segment 76, and acknowledgement 78.

Figure 8:
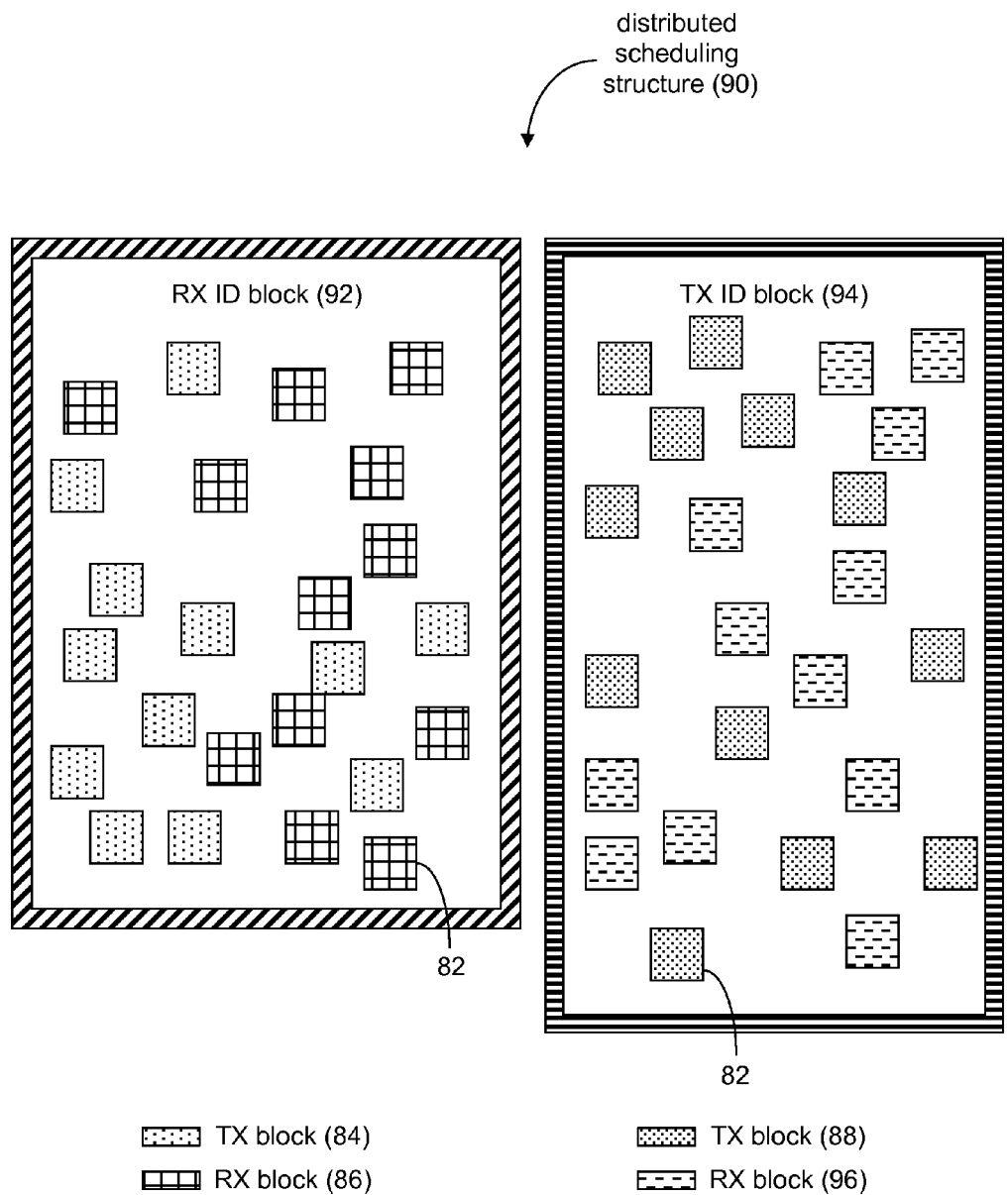
FIG. 8 is a block diagram of the novel distributed scheduling structure of FIG. 7 shown in a more amorphous orientation, to illustrate that the structure is distributed in time and frequency, according to some embodiments.

A novel distributed scheduling structure 90 found in the MACs 130 of FIG. 6 is illustrated in more detail in FIG. 7, according to some embodiments. Each traffic slot 64 includes a contention scheduling header 66 made up of the distributed scheduling structure 90. In the contention scheduling header 66, the tone matrix 90 consisting of two macro blocks are defined: a receiver identification block, RX ID block 92, and a transmitter identification block, TX ID block 94. For simplicity, the distributed scheduling structure 90 is depicted in the drawings as an orthogonal structure, similar to the tone matrix 50 (FIGS. 1-5). FIG. 8 presents a more realistic representation of the distributed scheduling structure 90, according to some embodiments.

The distributed scheduling structure 90 enables a potential transmitter in a wireless neighborhood to contend for a data segment 76 in the traffic slot and to effectively communicate with a potential receiver to ensure successful receipt of the data segment. The distributed scheduling structure 90 is made up of individual tones 82. The tones 82 are populated with ON or OFF signals, allowing transmitters and receivers to communicate with one another in a wireless neighborhood. In contrast to the CID-based distributed scheduling method 100 (FIG. 1) using the device ID-based distributed scheduling method 500 (FIG. 7), connections between transmitters and receivers are not necessarily established, so the distributed scheduling structure 90 first establishes transmitter-receiver connections, then enables communication between the transmitter-receiver pair.

In the RX ID block 92 (framed in diagonal stripes), each tone pair is mapped to a receiver device ID (DID), rather than a CID, and in the TX ID block 94 (framed in horizontal stripes), each tone pair is mapped to a transmitter DID. In FIG. 7, tone 82A and tone 82B in the RX ID block 92 constitute a single tone pair, mapped to a receiver DID. Tone 82B may be regarded as analogous to tone 82A, and vice-versa. Tone 82C and tone 82D in the TX ID block 94 also constitute a tone pair, mapped to a transmitter DID. Tone 82C may be regarded as analogous to tone 82D, and vice-versa.

In both the RX ID block 92 and the TX ID block 94, there are transmit block 84 (polka-dotted), transmit block 88 (tightly polka-dotted), receive block 86 (checkerboarded), and receive block 96 (horizontally dashed), respectively, enabling the transmitter and the receiver to send both requests and responses. Thus, within the RX ID block, the first tone 82A of the tone pair is located in the transmit block 84 while the second tone 82B is located in the receive block 86. Similarly, within the TX ID block 94, the first tone 82C of the tone pair is located in the TX block 88 while the second tone 82D is located in the receive block 96.

The distributed scheduling structure 90 enables a two-step scheduling operation. In a first step, the RX DID can be determined in the RX ID block. In a second step, the TX DID can be determined in the TX ID block, so that a complete scheduling can be done.

The distributed scheduling structure 90 is used to map device identifiers (DIDs) rather than CIDs, in some embodiments. This lowers the size requirement for the distributed scheduling structure 90 from $N^2$ (which is the size requirement for the tone matrix 50 in FIG. 1) to N, where N is the number of users, with each user most likely having both a transmit and a receive function (e.g., transceivers). The formula for the number of tone pairs needed in the distributed scheduling structure 90 is given as follows:

$$\text{\# of tone pairs} = 4*N \quad (2)$$

Thus, for a wireless neighborhood having eight users, the number of tone pairs needed is 32, with sixteen tones 82 being occupied in the RX ID block 92, sixteen tones in the TX ID block 94. Since the number of DIDs linearly increases with N instead of $N^2$, the contention overhead is reduced by a factor of N, in some embodiments, relative to using the CID-based distributed scheduling method 100.

For simplicity, in FIGS. 9, 10, 11A, 11B, 12, and 13, the distributed scheduling structure 90 is depicted much as the tone matrix 50 of FIGS. 1-5, that is, as a rectangular structure having contiguous tones 82 organized linearly. It is more precise, however, to think of the distributed scheduling structure 90 as a more amorphous structure, with tones 82 being physically distributed in both time and frequency.

FIG. 8 illustrates the distributed scheduling structure 90, in some embodiments, as having both an RX ID block 92 and a TX ID block 94, with the two blocks not necessarily being equal in size. The RX ID block 92 includes a TX block 84 and an RX block 86 consisting of tones 82; likewise, the TX ID block 94 includes a TX block 88 and an RX block 96 consisting of tones 82. The tones 82 making up the TX block 84 of the RX ID block 96 are not necessarily contiguous in either time or frequency, but may be spread out over a time period and frequency range. Similarly, the tones 82 making up the RX block 86, the TX block 88, and the RX block 96 contain tones 82 that are not contiguous over the time period and frequency range.

Thus, in some embodiments, the distributed scheduling structure 90 includes enough tones 82 to enable each transmitter and each receiver within a wireless neighborhood to be indicated by one of the tones. Although succeeding illustrations of the distributed scheduling structure 90 depict a rectangular structure, FIG. 8 provides a more realistic representation of the disorder within the structure.

Figure 9:
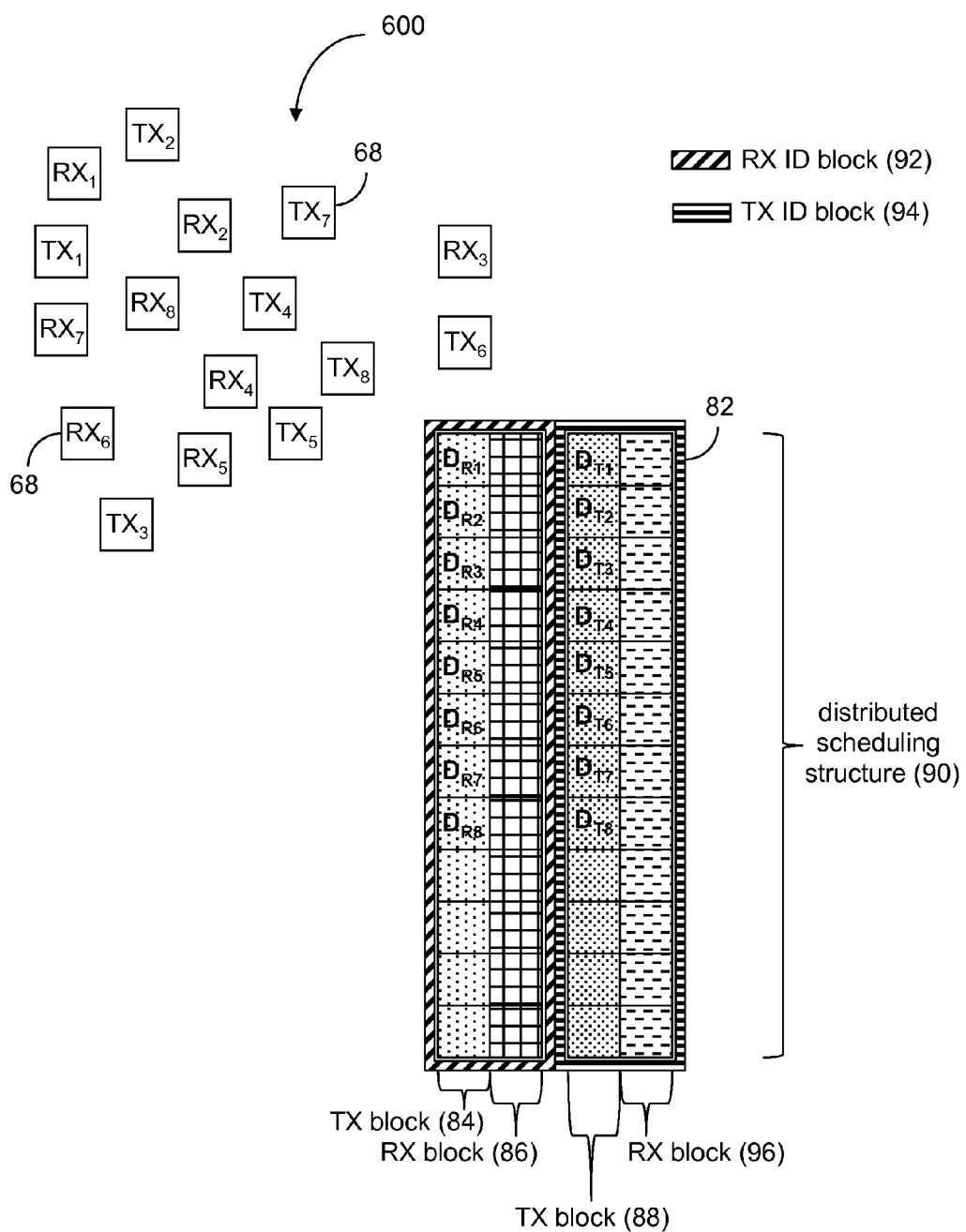
FIG. 9 is a diagram showing a possible distribution of device identifiers in the novel distributed scheduling structure, according to some embodiments.

For a group of D2D devices, each device is assigned a unique device ID (DID) within the group. A DID is mapped to a tone of the N tones in RX ID block 92 and TX ID block 94 as shown in FIG. 9, according to some embodiments, where N is the number of users. In FIG. 9, a wireless neighborhood 600 consisting of sixteen users 68. Each user 68 is presumed to be a transceiver, having both transmit and receive functions. Nevertheless, the users 68 are depicted according to their current function. Thus, sixteen transceivers 68 are depicted as eight receivers $RX_1$-$RX_8$ and eight transmitters $TX_1$-$TX_8$.

In contrast to the prior art example above, no connections between transmitter and receiver are as yet established, nor are such connections required with the device ID-based distributed scheduling method 500, in some embodiments. Receivers $RX_1$-$RX_8$ have associated DIDs $D_{R1}$-$D_{R8}$, respectively, while transmitters $TX_1$-$TX_8$ have associated DIDs $D_{T1}$-$D_{T8}$, respectively. Although device IDs appear to be presented in numerical order in the TX block 84 and TX block 88, the device IDs may populate the blocks in a variety of arrangements.

Figure 10:
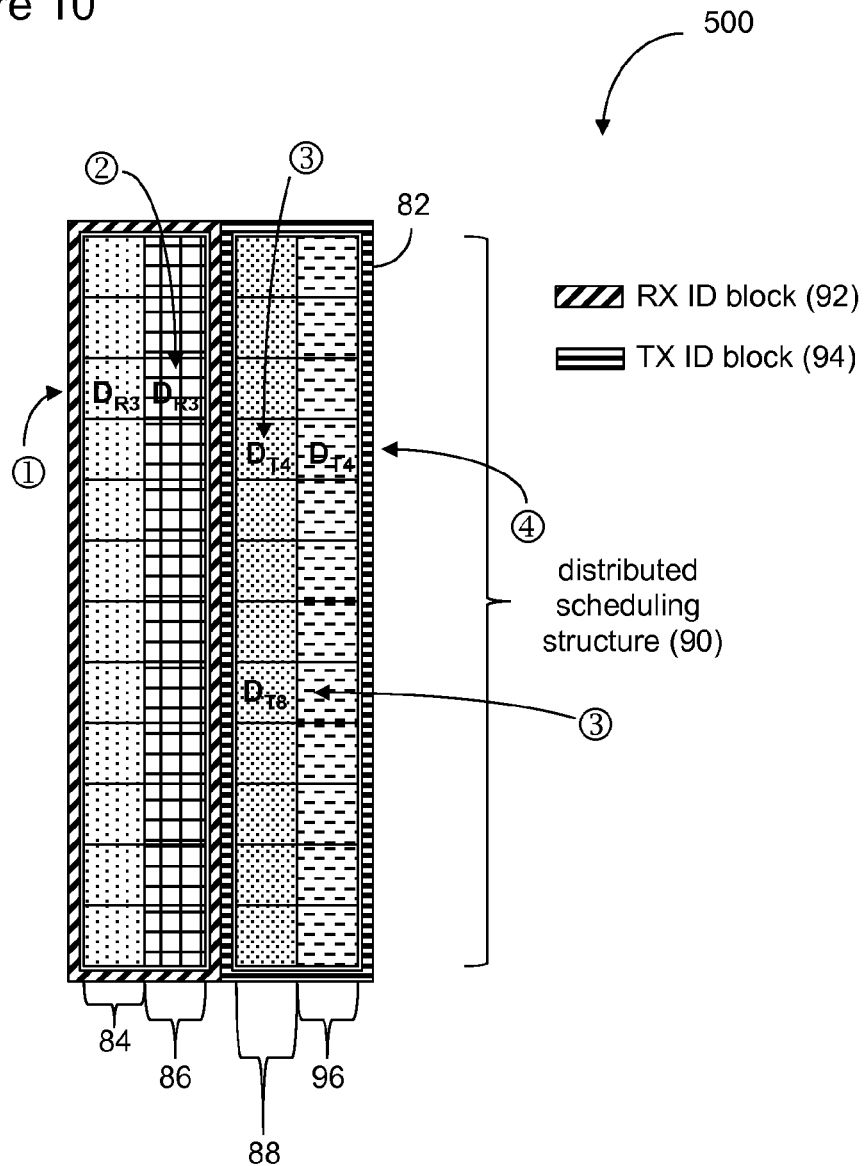
FIG. 10 is a diagram showing how the novel distributed scheduling structure is used for distributed scheduling between D2D devices without using connection IDs, according to some embodiments.

FIG. 10 shows the device ID-based distributed scheduling method 500 performed using the device ID-based tone matrix 90, according to some embodiments. In this example, assume that both the transmitter $TX_4$ and the transmitter $TX_8$ have data to send to the receiver $RX_3$. The transmitters first call the receiver by sending a signal on the tone 82 allocated for the receiver's identification. In these examples, $D_{R3}$ is used as the DID for receiver $RX_3$ (in this example, the DID tone assignments of FIG. 9 are assumed). Here, transmitters $TX_4$ and $TX_8$ send signals in the same tone 82 for $RX_3$ in the TX block 84 of the RX ID block 92 to let $RX_3$ and other receivers know a request has been made (step 1). Nevertheless, only the DID for $RX_3$ ($D_{R3}$) is visible in the TX block 84 of the RX ID block 92.

If a receiver sees that someone called its device ID, the receiver responds in an allocated tone 82. Since the third tone 82 of the TX block 84 is used for the DID of $RX_3$, the third tone of the RX block 86 is likewise used for the acknowledgement by the receiver $RX_3$. In FIG. 10, the receiver $RX_3$ responds by sending a signal as acknowledgement (ACK) in the analogous location of the RX block 86 of the RX ID block 92 (step 2).

In essence, receiver $RX_3$ is asking the transmitter to send its DID in the subsequent TX ID block 94. Where there is but a single transmitter vying for a single receiver, the two operations performed in the RX ID block 92, namely, the transmitter requesting connection to the receiver by sending a signal on the tone 82 allocated for the receiver, and the receiver acknowledging its availability, pairs the transmitter and receiver. In some embodiments, the receiver DIDs, not the transmitter DIDs, are stored in the RX ID block 92.

Where there are multiple transmitters calling the same receiver, as in FIG. 10, the second step occuring in the RX ID block 92 is merely an acknowledgement of availability by the receiver. Thus, in FIG. 10, the receiver may need to select one of the transmitters or schedule a sequence of transmissions. If the collision rate is small, this selection can be skipped. Otherwise, the contending transmitters of the same receiver may send a signal to differentiate them before sending data.

This is shown in the third step of FIG. 10. Since both transmitters $TX_4$ and $TX_8$ see the response from the receiver $RX_3$, transmitters $TX_4$ and $TX_8$ send signals respectively in their allocated tones for $TX_4$ and $TX_8$ in the TX block 88 of the TX ID block 94 of the tone matrix 90, with the DID for $TX_4$ being $D_{T4}$ and the DID for $TX_8$ being $D_{T8}$ (step 3). By providing the DIDs, this third step identifies the transmitters to the receiver $RX_3$. This enables the receiver $RX_3$ to make the final selection as between transmitter $TX_4$ and $TX_8$. The receiver $RX_3$ selects $TX_4$ for connection and data transmission by putting the DID for transmitter $TX_4$ ($D_{T4}$) in the analogous location of the RX block 96 of the TX ID block 94 (step 4). In some embodiments, the transmitter selection is based on some criteria, such as transmitter or connection priority.

For combating fading, more than one tone 82 of the tone matrix 90 is used, in some embodiments. For example, two tones 82 or four tones may be used. In some embodiments, the first goal of the device ID-based distributed scheduling method 500 is to pair a transmitter and receiver.

Figure 11A:
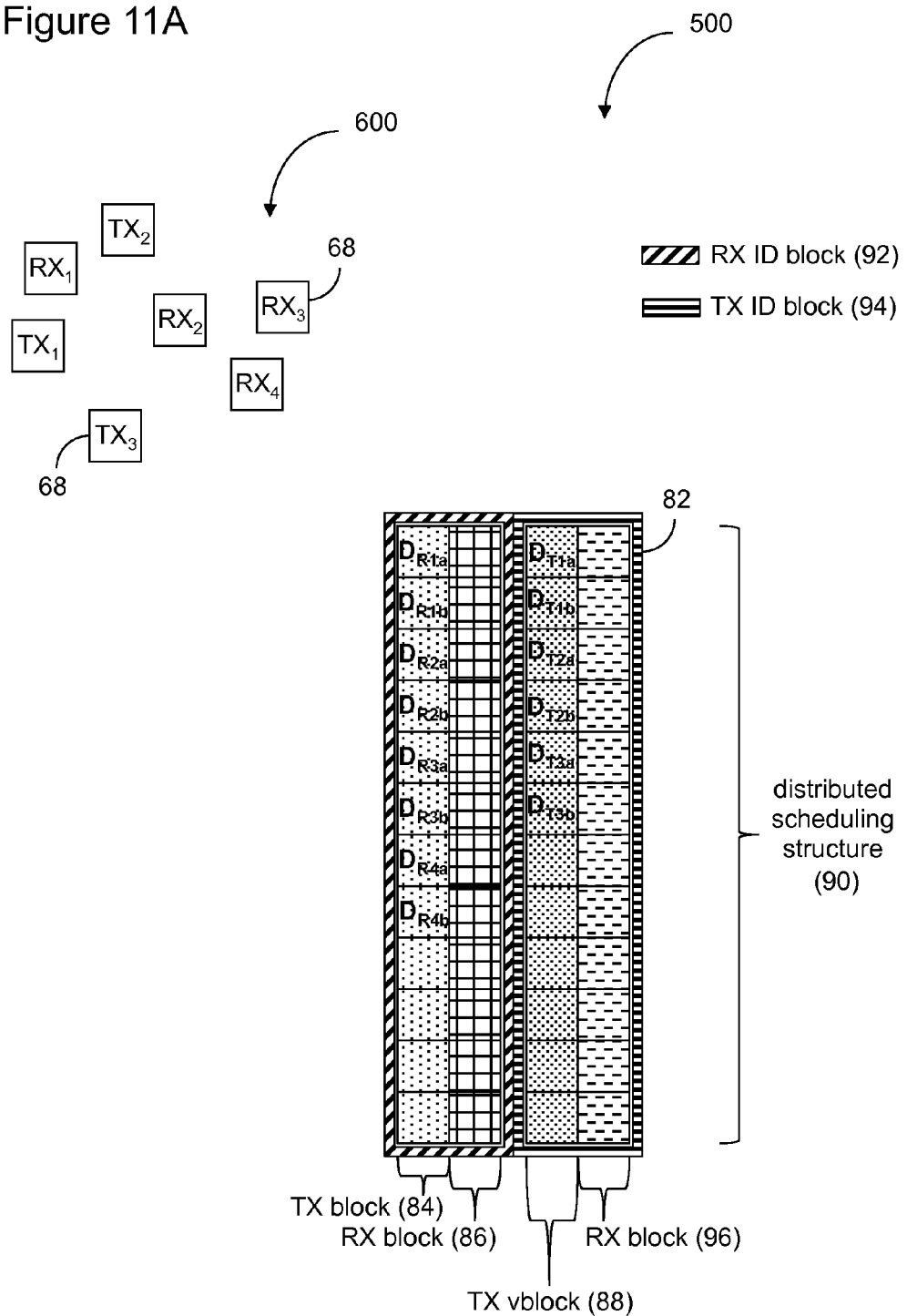

FIGS. 11A and 11B show two wireless neighborhoods 600 and 650, respectively. In the first wireless neighborhood 600, there are three transceivers 68 operating as transmitters ($TX_1$-$TX_3$) and there are four transceivers operating as receivers ($RX_1$-$RX_4$). Two tones, given by $D_{R1a}$ and $D_{R1b}$, are mapped to the DID associated with the receiver $RX_1$. Similarly, receiver $RX_2$ has two tones mapped to its DID, given by $D_{R2a}$ and $D_{R2b}$. The size of the wireless neighborhood that can be supported when two tones 82 are allocated for each device ID in the tone matrix 90 diminishes.

In FIG. 11B, wireless neighborhood 650 includes five transceivers 68, three operating as receivers, $RX_1$-$RX_3$, and two operating as transmitters, $TX_1$ and $TX_2$. This time, four tones 82 are allocated for each device ID. While the two-tone and four-tone solutions help to combat fading, in some embodiments, the number of transceivers 68 in the wireless neighborhoods 600, 650 supported by the tone matrix 90 is less than using the single-tone solution.

If there are multiple transmitters requesting to send to the same receiver, the receiver $RX_3$ can select one of the transmitters and schedule the data segment 76 for the selected transmitter to send the data. Using the device ID-based distributed scheduling method 500, the focus is on selecting one transmitter to send data, in some embodiments. In the final step of the operations depicted in FIG. 10, the receiver $RX_3$ notifies the selected transmitter $TX_4$ in the RX block 96 of the TX ID block 94 by putting the $TX_4$ DID ($D_{T4}$) in the analogous tone 82 location.

For differentiating between transmitters $TX_4$ and $TX_8$, a unique tone 82 may or may not be assigned for each transmitter DID. The reason is as follows. First, the chance of multiple transmitters contending for the same receiver at the same time may be low in D2D transmissions. Second, a small number of tones can be used for each contending transmitter to select according to its ID and/or priority. As long as the collision rate of the tone selection is low enough, say, 1%, there is no need to allocate a distinct tone for each transmitter, in some embodiments.

In another example, if, during one transmission request, e.g., from transmitter $TX_2$ to receiver $RX_7$, there is another transmission request, there are two solutions, in some embodiments. The first solution adopts the rule that the called receiver always responds if ready to receive.

Figure 12:
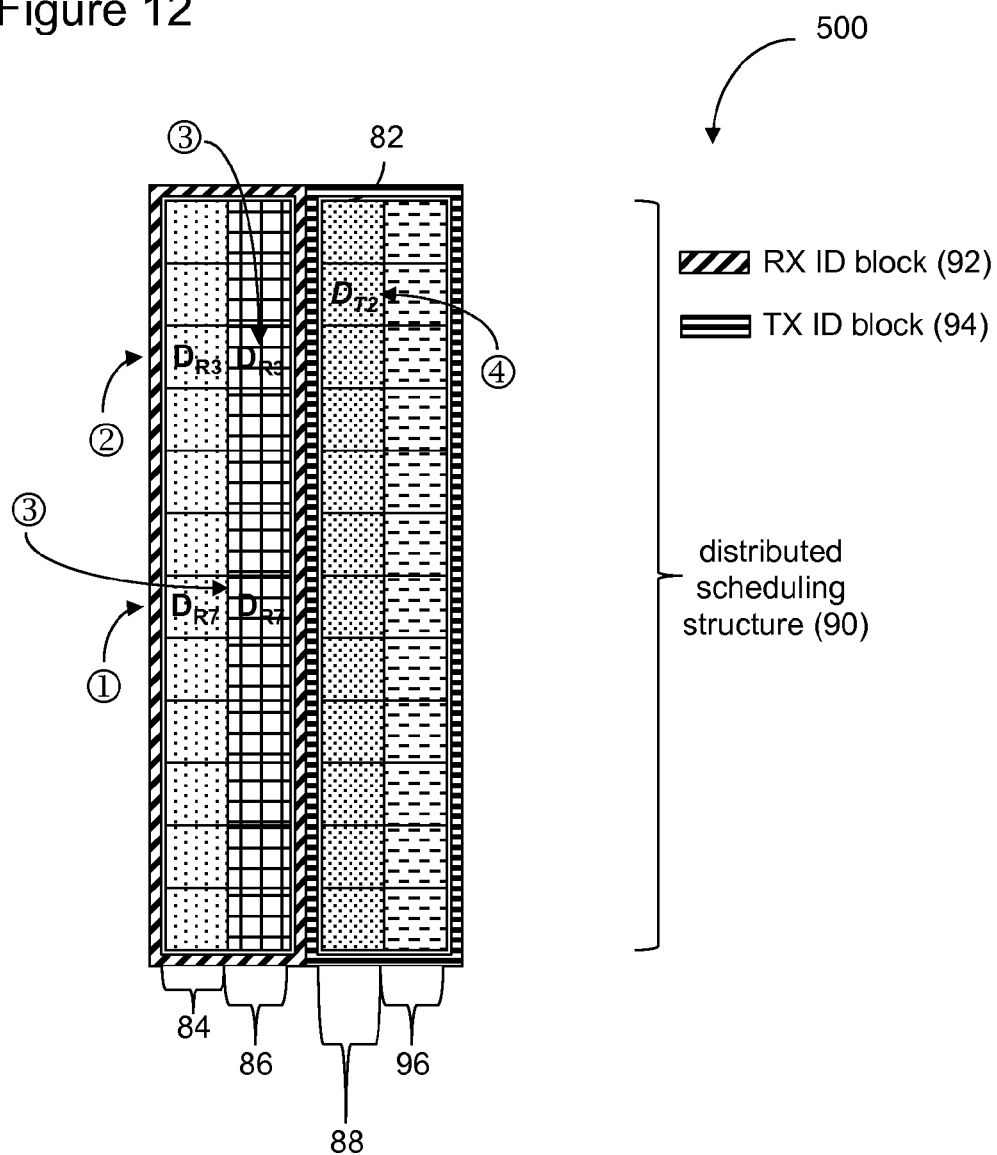
FIG. 12 is a second diagram showing how the novel distributed scheduling structure is used for distributed scheduling between D2D devices without using connection IDs, according to some embodiments.

FIG. 12 illustrates this first solution, according to some embodiments. The transmitter $TX_2$ requests connection to receiver $RX_7$ by sending a signal on the tone 82 of the relevant TX block 84 (step 1). Another transmitter, unknown to transmitter $TX_2$, requests connection to receiver $RX_3$ by sending a signal on the tone of the relevant TX block (step 2).

Next, the transmitter $TX_2$ finds out from the RX block 86 of the RX ID block 92 that both receiver $RX_3$ and receiver $RX_7$ respond (step 3). Further, the transmitter $TX_2$ learns that the received power from receivers $RX_3$ and $RX_7$ are strong. Therefore, based on the higher priority of the receiver $RX_3$ compared to its desired receiver $RX_7$, transmitter $TX_2$ quits further transmission to receiver $RX_7$ (step 4). The transmitter $TX_2$ estimates its potential interference to receiver $RX_3$ from the receiver power and decides to give up this time request because the response of receiver $RX_3$ used a tone 82 with a higher priority than the response of receiver $RX_7$. In FIG. 12, a dotted arrow indicates a failed (not completed) transaction, where transmitter $TX_2$ would have identified itself as the requesting transmitter, had the transmitter not quit ($TX_2$ device ID $DT_2$ is in italics).

Figure 13:
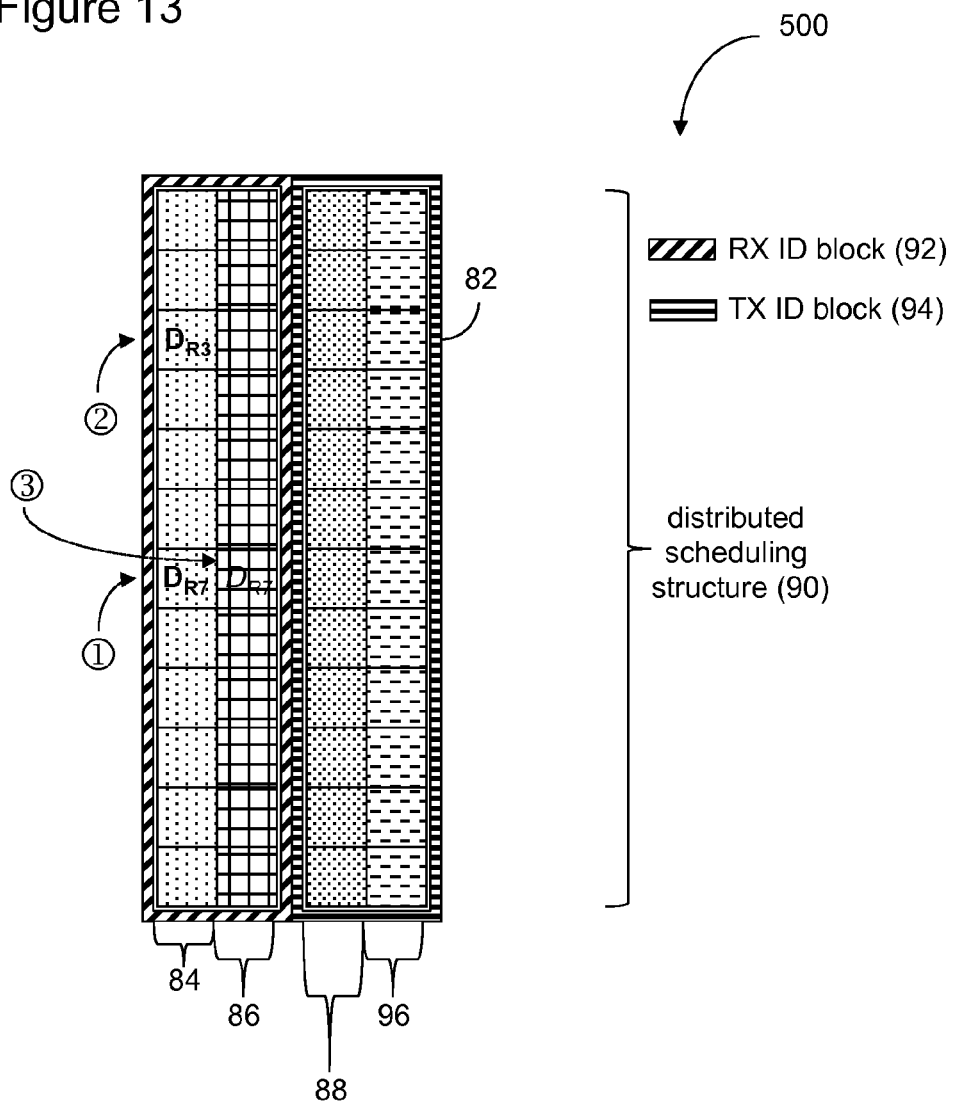
FIG. 13 is a third diagram showing how the novel distributed scheduling structure is used for distributed scheduling between D2D devices without using connection IDs, according to some embodiments.

The second solution is depicted in FIG. 13, according to some embodiments. For the second solution, as before, the transmitter $TX_2$ requests a connection to the receiver $RX_7$ (step 1). Another transmitter unknown to transmitter $TX_2$ requests connection to the receiver $RX_3$ (step 2). This time, it is the requested receiver, rather than the requesting transmitter, that acts: the receiver $RX_7$ takes both the expected interference from $RX_3$'s transmitter and the priority expressed in the RX ID block 92 into account. Although the transmitter that requested the connection to receiver $RX_3$ is unknown to transmitter $TX_2$, the receiver $RX_7$ is nevertheless able to calculate its expected interference relative to the desired transmission between transmitter $TX_2$ and receiver $RX_7$. Further, the receiver $RX_7$ knows the priority of the tones 82 in the RX ID block 92. Based on these two information elements, the receiver $RX_7$ does not respond to its requesting transmitter $TX_2$ in the RX block of the RX ID block 92. In FIG. 13, a dotted arrow indicates the failed (not completed) transaction, where receiver $RX_7$ would have identified itself as available, had the receiver $RX_7$ responded ($RX_7$ device ID $DR_7$ is in italics).

By using this method, the scheduling overhead can be saved, especially when the number of devices is large. For N devices, if there is a direct link (transmitter to receiver) between any two devices, there will be 4*N tones 82 required in both the RX ID block 92 and in the TX ID block 94, compared with 2*N*(N−1) in the prior art CID-based distributed scheduling method 100 (FIG. 1). Table 1 shows the savings to be realized, in some embodiments.

TABLE 1

Scheduling overhead savings with the number of devices

| N | # tones, prior art | # tones, proposed | savings in % |
|---|---|---|---|
| 5 | 40 | 20 | 50% |
| 10 | 180 | 40 | 78% |
| 20 | 760 | 80 | 89% |

For indicating priority of the transmission, one receiver may have multiple DIDs or tones 82, as illustrated in FIGS. 11A and 11B. A transmitter may select a proper receiver DID from them to indicate the priority of the transmission.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A transceiver capable of engaging, device-to-device, with other transceivers in a wireless neighborhood, the transceiver comprising:
   a device identifier-based (DID-based) distributed scheduling structure comprising a plurality of tones, the DID-based distributed scheduling structure comprising:
   a receiver (RX) identifier (ID) block, comprising tone pairs mapped to device IDs (DIDs) of transceivers operating as receivers in the wireless neighborhood, wherein the RX ID block comprises a first transmit block and a first receive block; and
   a transmitter (TX) ID block comprising tone pairs mapped to the DIDs of the transceivers operating as transmitters in the wireless neighborhood, wherein the TX ID block comprises a second transmit block and a second receive block; and
   a medium access controller (MAC) to:
   transmit a signal on a tone of the first transmit block of the DID-based distributed scheduling structure;
   receive an acknowledgement signal on an analogous tone of the first receive block;
   transmit a second signal on a second tone of the second transmit block, wherein the second tone identifies the transceiver to a receiver; and
   transmit data to the receiver in response to receiving a second acknowledgement signal on a second analogous tone of the second receive block;
   wherein a connection identifier specifying a connection between the transceiver and the receiver is not used during the transmission of the signal, the second signal, the acknowledgement signal, and the second acknowledgment signal;
   wherein the first transmit block, the first receive block, the second transmit block, and the second receive block each comprise a predetermined number of tones and one or more tones in the first transmit block of the RX ID block and one or more analogous tones in the first receive block of the RX ID block map to a distinct receiver DID;
   wherein two or more tones in the first transmit block of the RX ID block and two or more analogous tones in the first receive block of the RX ID block map to a distinct receiver DID.

2. The transceiver of claim 1, wherein the tone and the analogous tone comprise a first tone pair in the RX ID block.

3. The transceiver of claim 2, wherein the first tone pair is mapped to the DID of the receiver.

4. The transceiver of claim 1, wherein the MAC further comprises a software program executed by a central processing unit.

5. The transceiver of claim 1, wherein the MAC further comprises an application-specific integrated circuit driving a state machine implemented using logic registers.

6. The transceiver of claim 1, wherein the distributed scheduling structure is part of a contention scheduling field of a traffic slot of a data stream.

7. The transceiver of claim 1, wherein two tones in the first transmit block of the RX ID block and two analogous tones in the first receive block of the RX ID block map to a distinct receiver DID.

8. The transceiver of claim 1, wherein four tones in the first transmit block of the RX ID block and four analogous tones in the first receive block of the RX ID block map to a distinct receiver DID.

9. A distributed scheduling method for device-to-device (D2D) transmissions between transceivers in a wireless neighborhood, the method comprising:
   transmitting, by a transceiver operating as a requesting transmitter, a signal on a tone of a first section of a distributed scheduling structure, the distributed scheduling structure comprising a plurality of tones allocated into four distinct sections;
   transmitting, by the transceiver operating as the requesting transmitter, a second signal on a second tone of a second section of the distributed scheduling structure in response to having received an acknowledgement signal on an analogous tone of a third section of the distributed scheduling structure; and
   sending data, by the requesting transmitter, to a receiver in response to receiving a second acknowledgement signal on a second analogous tone of a fourth section of the distributed scheduling structure, wherein the second tone and the second analogous tone comprise a second tone pair;
   obtaining, by the requesting transmitter, a priority of a receiver (RX) device ID (DID) to which the acknowledgement signal is mapped;
   comparing, by the requesting transmitter, the priority to a second priority of a second RX DID, wherein a third tone mapped to the second RX DID is located in the third section of the distributed scheduling structure; and
   declining, by the requesting transmitter, to further communicate with the receiver, based on the second RX DID having a higher priority than the RX DID;
   wherein the tone and the analogous tone comprise a first tone pair and the second tone identifies the requesting transmitter to a receiver;
   wherein a connection identifier between the requesting transmitter and the receiver is not used during the transmission of the signal, the second signal, the acknowledgment signal, and the second acknowledgment signal;
   wherein two or more tones in the first section and two or more analogous tones in the third section of the distributed scheduling structure are mapped to a distinct receiver DID.

10. The method of claim 9, wherein the first section comprises a transmit (TX) block of a receiver (RX) identifier (ID) block of the distributed scheduling structure.

11. The method of claim 9, wherein the second section comprises a TX block of a TX ID block of the distributed scheduling structure.

12. The method of claim 10, wherein the third section comprises a RX block of the RX ID block of the distributed scheduling structure.

13. The method of claim 11, wherein the fourth section comprises a RX block of the TX ID block of the distributed scheduling structure.

14. A distributed scheduling method for device-to-device (D2D) transmissions between transceivers in a wireless neighborhood, the method comprising:
  receiving a signal on a tone of a transmit (TX) block of a receiver (RX) identifier (ID) block of a distributed scheduling structure corresponding to a device ID (DID) of a requested receiver, the distributed scheduling structure comprising both the RX ID block and a transmit (TX) ID block, the RX ID block comprising the TX block and a RX block, each of the TX ID block and the RX ID block comprising a plurality of tones, wherein one or more tones in the TX block of the RX ID block map to a distinct transceiver DID;
  receiving a second signal on a second tone of the TX block of the RX ID block of the distributed scheduling structure corresponding to a second DID of a second receiver; and
  declining, by the requested receiver, to respond to a transmission request, based on the DID of the requested receiver having a lower priority than the second DID of the second receiver;
wherein the signal and the second signal are transmitted without using a connection identifier between a requesting transmitter and the second receiver;
wherein two or more tones in the TX block of the RX ID block and two or more analogous tones in the RX block of the RX ID block map to a distinct receiver DID.

15. The distributed scheduling method of claim 14, wherein two tones in the TX block of the RX ID block map to a distinct receiver DID.

16. The distributed scheduling method of claim 14, wherein four tones in the TX block of the RX ID block map to a distinct receiver DID.

* * * * *